(12) United States Patent
Economou

(10) Patent No.: US 9,027,427 B2
(45) Date of Patent: May 12, 2015

(54) GEAR-BASED CONTINUOUSLY ENGAGED VARIABLE TRANSMISSION

(76) Inventor: Panayiotis Economou, Nicosia (CY)

( * ) Notice: Subject to any disclaimer, the term of this patent is extended or adjusted under 35 U.S.C. 154(b) by 1441 days.

(21) Appl. No.: 12/667,674

(22) PCT Filed: Jul. 2, 2007

(86) PCT No.: PCT/CY2007/000005
§ 371 (c)(1),
(2), (4) Date: Jun. 9, 2010

(87) PCT Pub. No.: WO2009/003426
PCT Pub. Date: Jan. 8, 2009

(65) Prior Publication Data
US 2010/0275712 A1    Nov. 4, 2010

(51) Int. Cl.
*F16H 55/17*     (2006.01)
*F16H 3/36*      (2006.01)

(52) U.S. Cl.
CPC ................................... *F16H 3/363* (2013.01)

(58) Field of Classification Search
CPC .............. F16H 2055/185; F16H 2200/0034; F16H 3/363; F16H 55/12; B60K 6/547; B60K 6/40; B60K 6/442; B60K 17/105; B60K 6/543
USPC ......... 74/665 F, 665 L, 665 Q, 112, 113, 116, 74/117; 475/14, 16, 162, 207, 255
See application file for complete search history.

(56) References Cited

U.S. PATENT DOCUMENTS

| 918,773    | A  | * | 4/1909  | Schatz        | 74/333   |
| 1,471,162  | A  | * | 10/1923 | Iacobacci     | 74/348   |
| 1,817,819  | A  | * | 8/1931  | Healey        | 74/348   |
| 2,697,365  | A  | * | 12/1954 | Williams      | 475/218  |
| 2,825,232  | A  | * | 3/1958  | Sieving et al.| 74/331   |
| 3,608,390  | A  | * | 9/1971  | Barrett       | 74/348   |
| 3,702,571  | A  | * | 11/1972 | Sainz         | 74/341   |
| 3,826,152  | A  | * | 7/1974  | Alexeev et al.| 74/424.5 |
| 4,056,018  | A  | * | 11/1977 | Chung         | 74/665 P |
| 5,490,433  | A  | * | 2/1996  | Althen        | 74/348   |
| 5,653,142  | A  | * | 8/1997  | Kato          | 74/112   |
| 5,653,143  | A  | * | 8/1997  | Langevin      | 74/348   |
| 6,044,718  | A  | * | 4/2000  | Lester        | 74/112   |
| 6,321,613  | B1 | * | 11/2001 | Avidor        | 74/348   |
| 6,802,229  | B1 | * | 10/2004 | Lambert       | 74/348   |

(Continued)

FOREIGN PATENT DOCUMENTS

DE    2111113 A1    9/1972
FR    679635 A      4/1930

(Continued)

*Primary Examiner* — William Kelleher
*Assistant Examiner* — Jude Agendia
(74) *Attorney, Agent, or Firm* — Browdy and Neimark, PLLC

(57) ABSTRACT

A method is described for changing gear-ratio by displacing at least one part of the engaging surface of a composite gear (21) and aligning it to the engaging surface of another gear (22), thus permitting a complementary third gear (25) engaged to the engaging surface, to shift from one composite gear to a different composite gear, while being constantly engaged. The method can be employed in a device, which can be used to form a gear-based, continuously engaged, variable transmission. Such a transmission, enhanced by—being combined with a differential assembly and the appropriate gearing, can provide rotational motion at various speeds in one direction and the reverse direction as well as zero motion.

38 Claims, 11 Drawing Sheets

(56) References Cited

U.S. PATENT DOCUMENTS

| | | | |
|---|---|---|---|
| 7,219,579 B2 * | 5/2007 | Turner | 74/665 N |
| 7,845,247 B2 * | 12/2010 | Olds et al. | 74/333 |
| 7,958,799 B1 * | 6/2011 | Cillessen et al. | 74/348 |
| 8,109,852 B2 * | 2/2012 | Lee | 475/16 |
| 2003/0042357 A1 | 3/2003 | Van Cor | |
| 2006/0185456 A1 * | 8/2006 | Gerlofs et al. | 74/325 |

FOREIGN PATENT DOCUMENTS

| | | |
|---|---|---|
| FR | 2686384 A | 7/1993 |
| GB | 191126574 A | 11/1912 |
| GB | 145452 A | 9/1920 |

\* cited by examiner

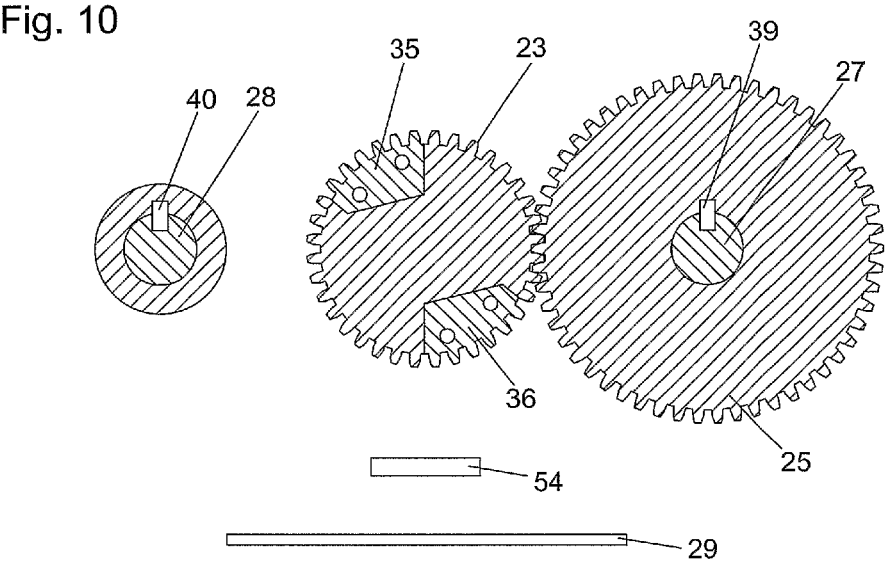
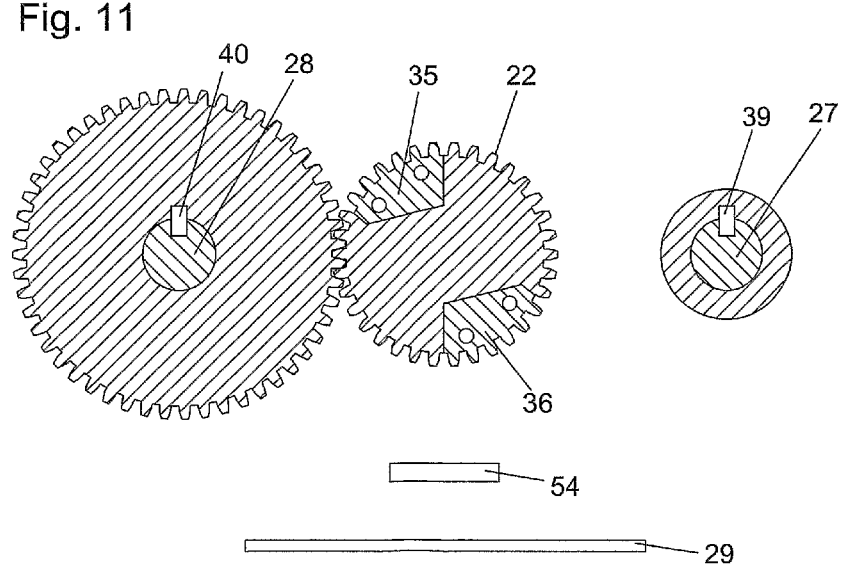

GEAR-BASED CONTINUOUSLY ENGAGED VARIABLE TRANSMISSION

TECHNICAL FIELD

The invention relates to methods and devices to be used to modulate rotational speed or torque in any mechanical, electromechanical or electrical device or assembly, like for example a variable transmission, where there is a source of rotational motion and a final destination of that motion and there is the need for the rate of rotation at the destination to be variable. The invention further relates to methods and devices to be used to modulate rotational motion or torque anywhere where there may also be a need to provide a state of being, in which the source of rotation is providing rotational motion while the final destination is stationary and a state of being in which the final destination has to stop being stationary and start rotating.

BACKGROUND ART

The best example, where the needed rotational speed or torque is variable in relation to the supplied rotational speed or torque, is that of the motor vehicle. To achieve the above, motor vehicles usually employ a manual, an automatic or a type of continuously variable transmission, from now on referred to as 'CVT'. Examples of continuously variable transmissions include devices using a belt with conical pulley systems, friction disc transmissions, hydraulic traction fluid based systems and ratcheting CVTs.

In manual transmissions, gear-ratio is varied by engaging different gear pairs of various diameters. In automatic transmissions the gear-ratio is varied usually by employing planetary gears and by altering, which gears act as the input gears and which act as the output gears. In manual transmissions a clutch or similar mechanism is usually used to disengage the source of torque from the input and output gears during gear ratio change. In automatic transmissions, friction clutches, brake bands and, friction brakes are used to halt one line of force transfer and release another.

In continuously variable transmissions using a belt with conical pulley systems, and in friction disc transmissions, gear-ratio is varied by altering the torque transferring site of contact between frictional surfaces. Thus, no clutches or brake bands or friction brakes are needed for gear-change. However, torque is transferred through frictional surfaces. In hydraulic CVTs all power is transmitted by hydraulic fluid. Gear-ratio change is achieved by the use of a variable displacement pump which then sends hydraulic fluid at different rates to a hydraulic motor. In ratcheting CVT a set of elements, successively become engaged and then disengaged between the driving system and the driven system, usually using oscillating or indexing motion in conjunction with one-way clutches or ratchets that rectify and sum only one way motion. The gear-ratio is adjusted by changing linkage geometry within the oscillating elements, so that the summed maximum linkage speed is adjusted, even when the average linkage speed remains constant.

Clutches or torque converters are used in association with most transmissions of the prior art, to enable the engine to run while the wheels are stationary and also to bring about vehicle launch. An exception is the infinitely variable transmission, referred to as 'IVT' which results from the combination of a CVT with an epicyclic gear system.

DISCLOSURE OF INVENTION

Technical Problem

During the phase of gear ratio change, in the vast majority of manual and automatic transmissions, the input gears are actually disengaged from the output gears. In addition, gear change is not immediate but instead takes a small but definite amount of time. During that time, no force is being transferred. Both manual and automatic transmissions are associated with loss of power transfer during transmission gear-ratio change. An exception is the twin-clutch transmission, also called a parallel manual transmission which utilizes two input shafts. Gear-ratio is changed in the disengaged input shaft and then power is transferred to it by engagement of the corresponding clutch and disengagement of the clutch of the other input shaft. This arrangement achieves power transfer during gear-ratio change at the expense of more wear and tear in the clutches.

In addition, in the majority of manual and automatic transmissions, only a small number of relatively widely spaced gear ratios are provided, because the provision of more and more steps increases the complexity, weight, size and cost of the transmission disproportionately. Also during gear-ratio change, there is wear and tear, in the clutch used in manual transmissions and in the brakes and bands used in automatic transmissions.

In the case of most continuously variable transmissions, there is no need for clutches, bands or brakes during transmission gear-ratio change. Also, for a given size of transmission, more steps are being offered (up to infinite) and in addition it is possible for the input and output gears to be continuously engaged. However, these transmissions have other inherent disadvantages. Those that employ dynamic friction interfaces like belt driven and friction disc transmissions rely on friction for power transfer, which in itself can result in wear and tear. There is also a limit to the degree of torque that they can transfer because there is the risk of possible slip, between the frictional surfaces. In addition, expensive mechanisms are necessary to maintain the appropriate pressure between the friction surfaces, to minimize possible slip. Continuously variable transmissions employing hydraulic pumps have drawbacks like energy losses and limitations associated with fluid flow at high speed. They are also more prone to contamination. With regard to ratcheting CVTs, one of their main drawbacks is that of vibration and the problems caused by it.

Automatic and manual transmissions of the prior art, as well as a lot of embodiments of continuously variable transmissions, also present an additional problem. This is the problem of moving a vehicle from stand-still. Start clutches or torque converters are usually used. All these devices result in waste of energy or increased wear and tear or both.

Such devices of the prior art have undergone ever increasing sophistication, in order to minimize their inherent disadvantages, with impressive results. However, the applicant believes there is room for improvement.

Technical Solution

This invention is intended to provide an alternative that overcomes most of the disadvantages of the prior art, by providing a method of changing gear-ratio without disengaging the source of rotational motion from the destination while, if desired, keeping them engaged through gears instead of friction.

One of the basic principles of this invention is the use of a gear of any type, characterized by the fact that at least one part of its engaging surface, together with at least as much of the body of the gear as necessary to support that surface, can be displaced relative to the gear. The part of such a gear that can be displaced as described, will form now on be referred to as the 'displaceable part'. Such a gear can be of any type or description including a spur gear or a ring gear. For the sake of clarity we will refer to such a gear as a 'composite gear', consisting of the body and at least one displaceable part. The engaging surface is the surface comprising geometrical structures, usually gear teeth, which mesh with corresponding complementary geometrical structures of another gear, to transfer rotational motion. Such geometrical structures will be referred to, from now on, as 'teeth'. The other gear possessing the complementary geometrical structures will, from now on, be referred to as a 'complementary gear' and is a gear of any type, characterized by being able to engage the composite gear and also engage in turn all the other composite gears which are to be used in the specific embodiment of the invention. If composite gears of different diameters are used, the shapes of the geometrical structures (teeth) are adjusted as necessary according to the diameter, to permit transfer of rotational motion to and from the complementary gear and any of the composite gears to be used. The displaceable part of each composite gear is utilized, as described later on, to enable a complementary gear engaged to one composite gear to engage a second composite gear. If two composite gears of different diameters are used, then gear-ratio change is achieved during the process.

Any construction and mode of displacement of the displaceable part of the composite gear can be used, as long as it ensures that the displaceable part of one composite gear can be displaced in such a way, so that its engaging surface can get functionally aligned to the engaging surface of the body of a second composite gear at, at least one site, in such a way that would allow the complementary gear to rotate across from the displaceable part of the first composite gear to the body of the second composite gear and vice versa. Usually, this involves a corresponding displacement of the displaceable part of the second composite gear in order to make space for the displaceable part of the first composite gear.

The engaging surface of the displaceable part of a composite gear is aligned to the engaging surface of the body of the same composite gear at two main sites, One site is the site of best alignment, and will be referred to, from now on, as the 'site of best alignment'. This is the site where the displaceable part also best aligns its engaging surface to that of the body of another composite gear, when it is displaced. At this site the gear-teeth or any other geometrical shapes used for engagement, must match to provide an engaging surface which is functionally continuous. The other site which, from now on, will be referred to as the 'secondary site', is the site where alignment with another composite gear after displacement, need not be perfect or may not be achievable at all.

The degree of alignment between the displaceable part of one composite gear and the body of another, at the secondary site, is determined by many factors including the shape and size of the displaceable part and the nature of the engaging surface. If the degree of alignment is such that, with the displaceable part displaced and aligned to the body of a second composite gear, the complementary gear can rotate across the site of best alignment as well as the secondary site, then gear shift can be achieved as follows: After the complementary gear engages the displaceable part, while the complementary gear is still rotating, the displaceable part together with the complementary gear are displaced and the displaceable part is aligned to the body of a second composite gear in time for the complementary gear to rotate off the displaceable part of the first composite gear and engage the body of the second composite gear.

If alignment at the secondary site between the displaceable part of one composite gear and the body of a second composite gear is not perfect or not achievable at all, then depending on the direction of rotation of the complementary gear, in relation to the composite gear and more specifically the direction of rotation of the complementary gear in relation to the displaceable part of the composite gear, gear-ratio change can be achieved best, in one of two ways.

If the direction of rotation is such that the complementary gear engages the displaceable part at the secondary site and rotates towards the site of best alignment, then gear change is achieved as follows: While the complementary gear and the first composite gear are in mesh and rotating, when the complementary gear engages the displaceable part at the secondary site and while the complementary gear is still rotating, the displaceable part is moved (together with the complementary gear) to replace the displaceable part of the second composite gear and get aligned with the body of the second composite gear before the complementary gear could reach the site of best alignment, at which site the complementary gear leaves the displaceable part and engages the body of the second composite gear. Gear change is completed by movement of the displaceable part of the first and second composite gears back to their neutral positions, on their corresponding composite gears, this being completed before the complementary gear can reach the secondary site and engage the displaceable part.

If the direction of rotation is such that the complementary gear engages the displaceable part at the site of best alignment and rotates towards the secondary site, then gear change is achieved as follows: While the complementary gear and the first composite gear are in mesh and rotating, at the phase when the complementary gear is engaged to the body of the first composite gear, the displaceable part of the second composite gear is moved to replace the displaceable part of the first composite gear and to get aligned to the body of the first composite gear before the complementary gear reaches the site of best alignment When this point is reached, the complementary gear, while rotating in relation to the composite gear, disengages the body of the first composite gear and engages the displaceable part of the second composite gear. The displaceable part of the second composite gear is then returned (together with the complementary gear) back to its neutral position on the second composite gear before the complementary gear reaches the secondary site and engages the body of the second composite gear.

For any given number of composite gears, intended to be used together in an embodiment of the invention, if gear-teeth or other complementary geometrical shapes are used, the rotational orientation of each composite gear should be such that, at least one set of teeth (that is, one tooth from each composite gear) or the corresponding space between teeth (that is, one space from each composite gear) are aligned along an imaginary line of best alignment, from now on referred to as 'line of best alignment'. When this is so, the teeth of each corresponding composite gear near the line of best alignment are still aligned, be it less perfectly, thus forming secondary lines of alignment, referred to, from now on, as 'secondary lines of alignment', which together with the line of best alignment constitute, what will be referred to from now on as a 'band of alignment'. In any given embodiment, comprising composite gears of increasing diameters and where the difference in the number of teeth between each consecutive composite gear is the same, irrespective of whether other structures, if any, are placed between the composite gears, the maximum number of bands of alignment possible, is equivalent to the difference in the number of teeth between each consecutive composite gear. Each set of composite gears to be used together in an embodiment of this invention will be referred to, from now on, as a 'central gear'. Each set of displaceable parts comprising corresponding displaceable parts from each of the composite gears of a central gear will be referred to, from now on, as an 'elevator'. For each elevator, the sites of best alignment of each of the displaceable parts have to form their own line of alignment and each such line has to lie within a band of alignment, parallel to one of the lines of secondary alignment or preferably parallel to and as close as possible to, or on, the line of best alignment.

The above description is not intended to be limiting. Many combinations can be used. Any number of composite gears can be used according to how many gear-change steps are required of the specific transmission or device. Any gears can be used and they can be used in any way. For example, both the composite and the complementary gears may rotate on their own axles or shafts. Another example is for the composite gears to be stationary and the complementary gear to rotate around or inside them. Also the terms displaceable part and body of the composite gear are terms used simply to aid the description. The movement between them is relative. In addition more than one complementary gear can be used.

One of the advantages of this invention is that transfer of rotational motion, even during gear-ratio change, can be achieved through the use of gear-teeth or other complementary geometrical shapes, in mesh. However, even though this potential advantage is included in the title of the invention, this feature is not intended to be limiting. In other words the invention can work quite well by the use of frictional surfaces instead of gear-teeth and such embodiments can be built and used.

In some embodiments of this invention, an extra device or extra devices can be used in such a way that would allow the output gear of the combined assembly to be at stand-still while the input gears are rotating. Such a device could be any device that facilitates the subtraction of one rotational speed from another rotational speed, like for example a planetary gear system or a differential gear system and from now on will be referred to as a 'differential assembly'. This would allow moving a vehicle from stand-still by simply changing gear-ratio, minimizing friction and wear and tear.

Any type of differential assembly, with at least three input-output components that can modulate rotational speed as already described, can be used. Examples of such input-output components are: the differential carrier, the first half-axle and the second half-axle, of a differential gear system. Two of the components are used to input rotational force and one is used to deliver that force. The differential assembly and the two power trains employed to bring the rotational force, from the power source or sources, to the differential assembly, can be envisaged as constituting a form of imaginary loop. The power source or sources can be outside the loop in which case rotational force is transferred to a component of the loop that comprises gears that split the rotational force to the two arms of the loop. Alternatively, the power source or sources can be within the loop in which case rotational force is delivered from the power source or sources directly to the two arms of the loop. A combination of the above can also be employed. Within the loop there should be at least one mechanism that can bring about gear-ratio change, like an embodiment of the device disclosed in this invention. Such a device can also be the site of entry of rotational motion from the power source. It can also constitute most of the loop by itself, as will be described in one of the examples later on. Within the loop, various other devices, gears or transmissions can also be employed. No matter which way the loop is constituted, the gearing and constitution of the loop should be arranged in such a way that during at least one gear-ratio position of the device disclosed in this invention, the two inputs to the differential assembly are such, and in such a direction, that the output component is stationary. In this state of affairs the output component is stationary and is kept immobile by the differential assembly irrespective of the speed of rotation of the input components. A change in the gear ratio in the device disclosed in this invention, then forces the output component to start rotating. Depending on the direction of gear change, the output component will rotate in either one or the other direction. Further gear changes in any direction will bring about an increase in the rate of rotation of the output component.

Advantageous Effects

The present invention demonstrates methods and devices for gear-ratio change, in which power can be transferred even during gear-ratio change and where the input and output gears are continuously engaged not necessarily through friction but through gears meshed together, thus minimizing wear and tear and abolishing possible slip. A variable transmission based on these methods or devices can avoid most of the drawbacks of variable transmissions of the prior art.

In addition, in embodiments of this invention where a differential assembly is coupled with the transmission in an appropriate way, it becomes possible for the destination of rotational motion to rotate, at varying speeds, in one or the other direction, or be kept stationary while the source of rotational motion is rotating at any speed. In the case of a motor vehicle this would represent forward and reverse motion as well as engine breaking and vehicle launch, all achieved with minimal wear and tear and no power loss. It also means that the vehicle could be poised in an uphill position and it would be kept stationary without the use of brakes. An additional benefit is that there would be no need for break release during vehicle launch. The rate of launch can be controlled too. The rate of launch is proportional to the rotational speed of the input components (and the power source) at the time of gear-ratio change in the transmission.

More than one transmission, as disclosed in this invention, with or without a differential assembly, could also be used in the same vehicle to modulate the distribution of rotational motion to individual wheels of a vehicle. This is possible because of the characteristics of easy and quick gear-ratio change with minimal wear and tear and no slip. Such modulation could be controlled by an electronic device which through appropriate sensors could calculate the degree of turning of the steering wheel, the speed of rotation of the wheels as well as the acceleration of the vehicle. Such an arrangement should offer higher road safety and better vehicle performance.

DESCRIPTION OF DRAWINGS

FIG. 10 demonstrates a cross section from the embodiment demonstrated in FIG. 9.

FIG. 11 demonstrates another cross section from the embodiment demonstrated in FIG. 9.

BEST MODES

In the following description and the accompanying drawings, the present invention will be described in more detail in terms of exemplary embodiments. It is to be understood that the invention is not to be limited in any way to these exemplary embodiments. Words used here are words of description rather than of limitation. The invention is intended to cover various modifications and equivalent arrangements. Multiple changes in the form of the invention may be made without departing from the spirit and scope of the invention as disclosed.

Nuts and bolts as well as most of the support structures have been omitted for the sake of clarity. Ball bearings have also been omitted as well as other details of construction, all in an effort to make the description easier and the drawings simpler and clearer.

Figure 1:
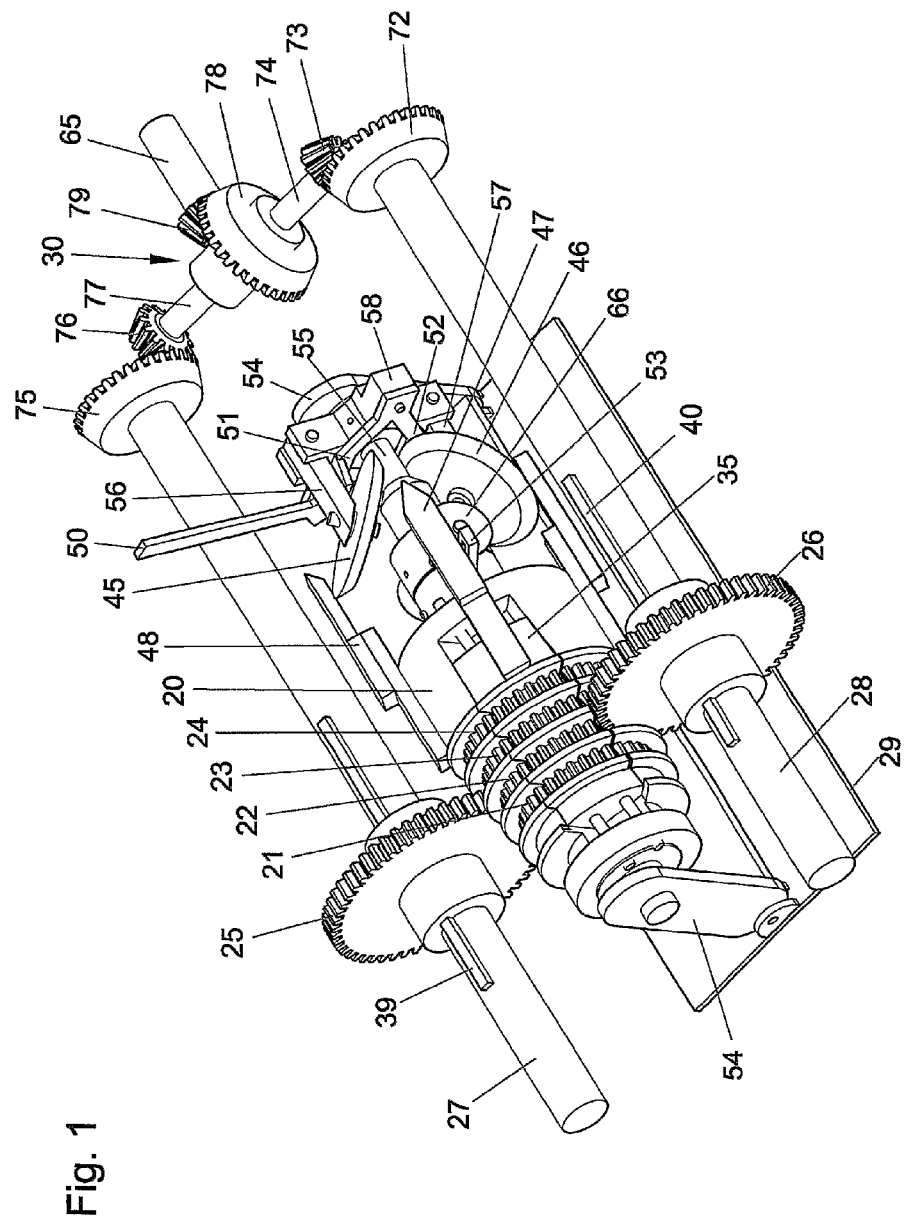
FIG. 1 is a perspective view of one embodiment with a central gear, two elevators, two complementary gears, most of the components of the control mechanism and a differential gear.
Figure 2:
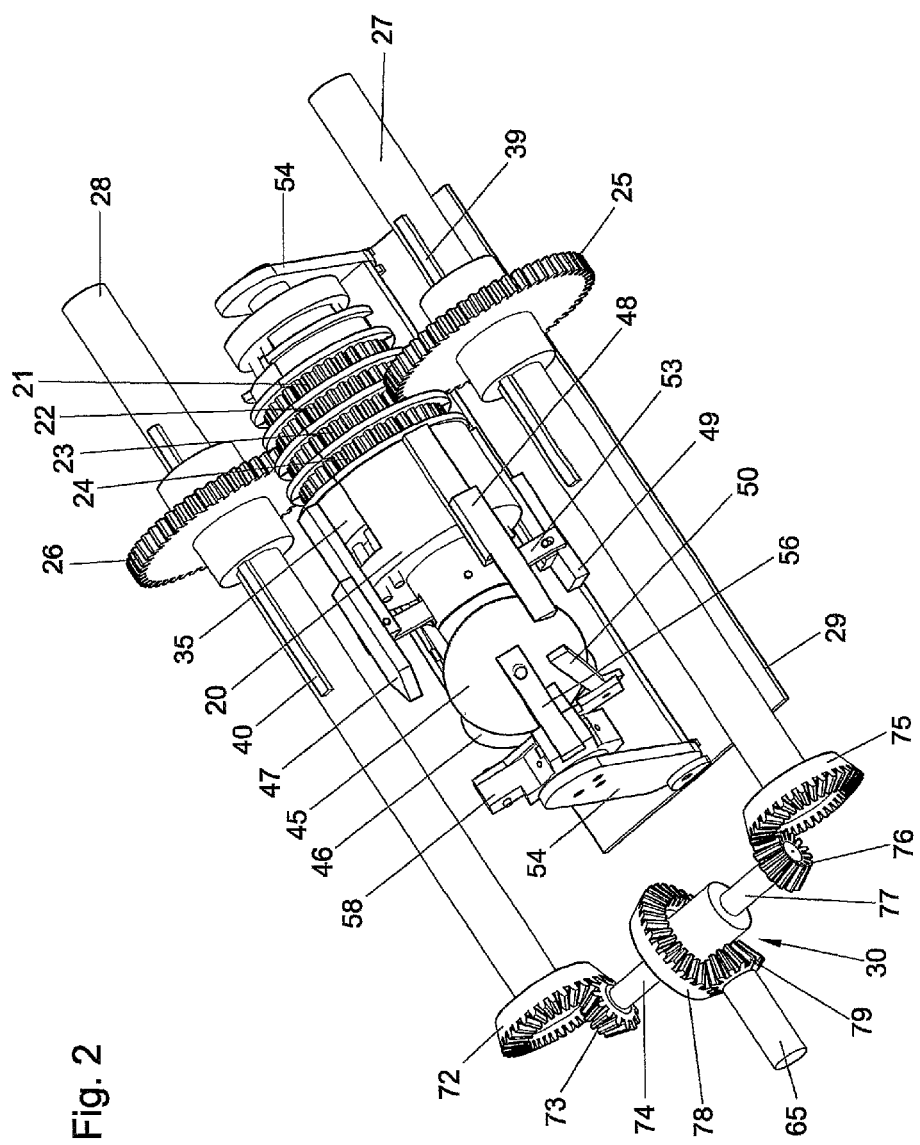
FIG. 2 is a perspective view of the embodiment demonstrated in FIG. 1 seen from a different angle.

The first embodiment of the invention presented is a transmission for use in a vehicle. The transmission as shown in FIG. 1 and FIG. 2 is comprised of the following major elements: a central gear 20, two complementary gears 25 and 26 with their corresponding shafts 27 and 28, the support structures (of which only a small part of the base 29 is shown), the control mechanism (examples represented by numbers 45, 54, 55, 58) and a differential gear 30.

In this embodiment spur gears have been used. Only four composite gears 21, 22, 23, 24, have been included in the central gear, just enough to demonstrate all the features of the invention. In other embodiments any number of composite gears could be used. In this embodiment the difference in the number of gear-teeth between neighbouring composite gears is two. The first composite gear 21 possesses 32 teeth, the second composite gear 22 possesses 34 teeth, the third composite gear 23 possesses 36 teeth and the fourth composite gear 24 possesses 38 teeth. The first complementary gear 25 possesses 54 teeth and the second 26 possesses 51 teeth.

Figure 3:
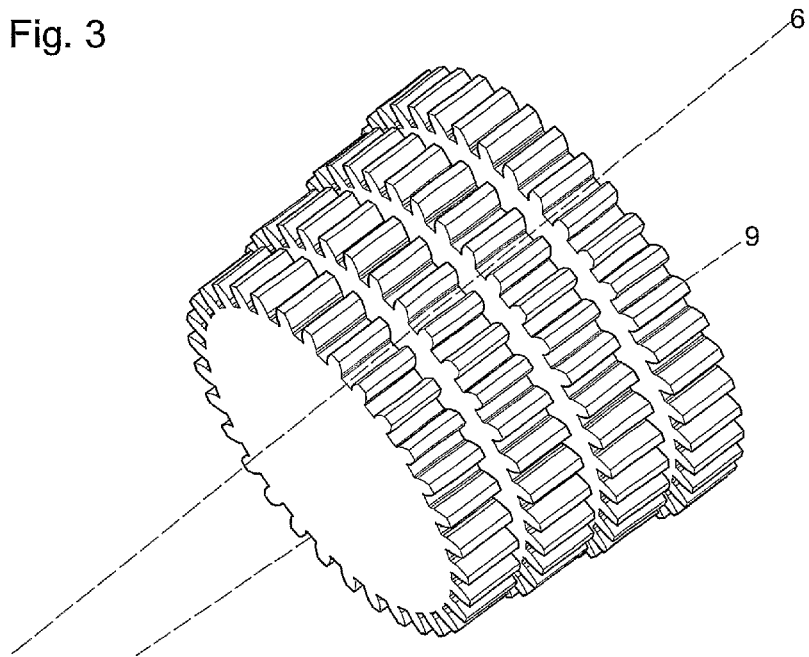
FIG. 3 is a perspective view of the composite gears of the embodiment demonstrated in FIG. 1, isolated and without their partitions, in order to demonstrate the alignment of gear-teeth along two imaginary lines of alignment.
Figure 4:
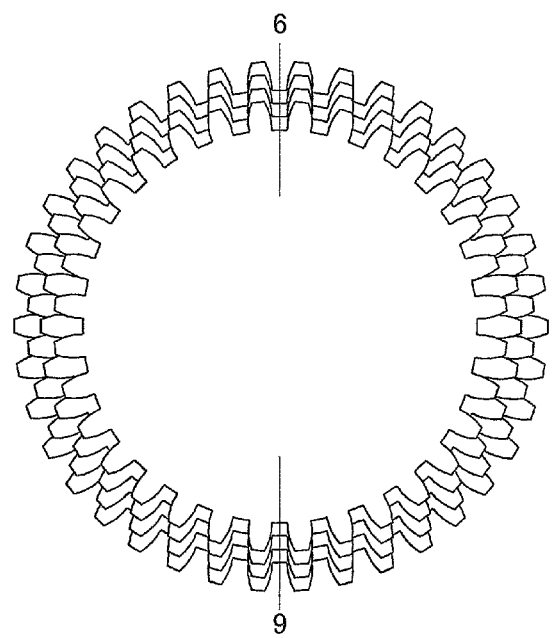
FIG. 4 is a perspective view of the composite gears demonstrated in FIG. 3 seen from a different angle.

FIG. 3 and FIG. 4 show the composite gears of the central gear isolated without their partitions. The aim was to demonstrate the gear teeth on the engaging surfaces and the two imaginary lines of alignment, 6 and 9. Each one is on the opposite side of the axis of the central gear, with rotational symmetry of 180 degrees. The sites of best alignment of the displaceable parts of the composite gears lie on these lines.

Figure 5:
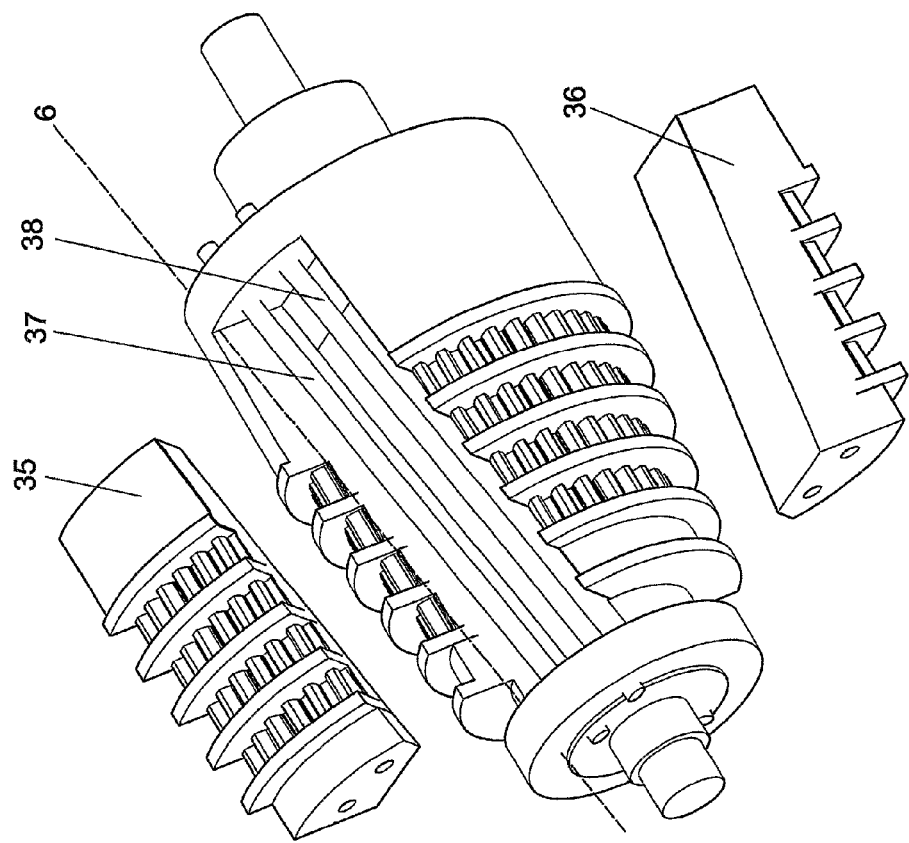
FIG. 5 is a perspective view of the central gear, in which the elevators are detached from their normal positions on the central gear, to better demonstrate the structure of the central gear.
Figure 6:
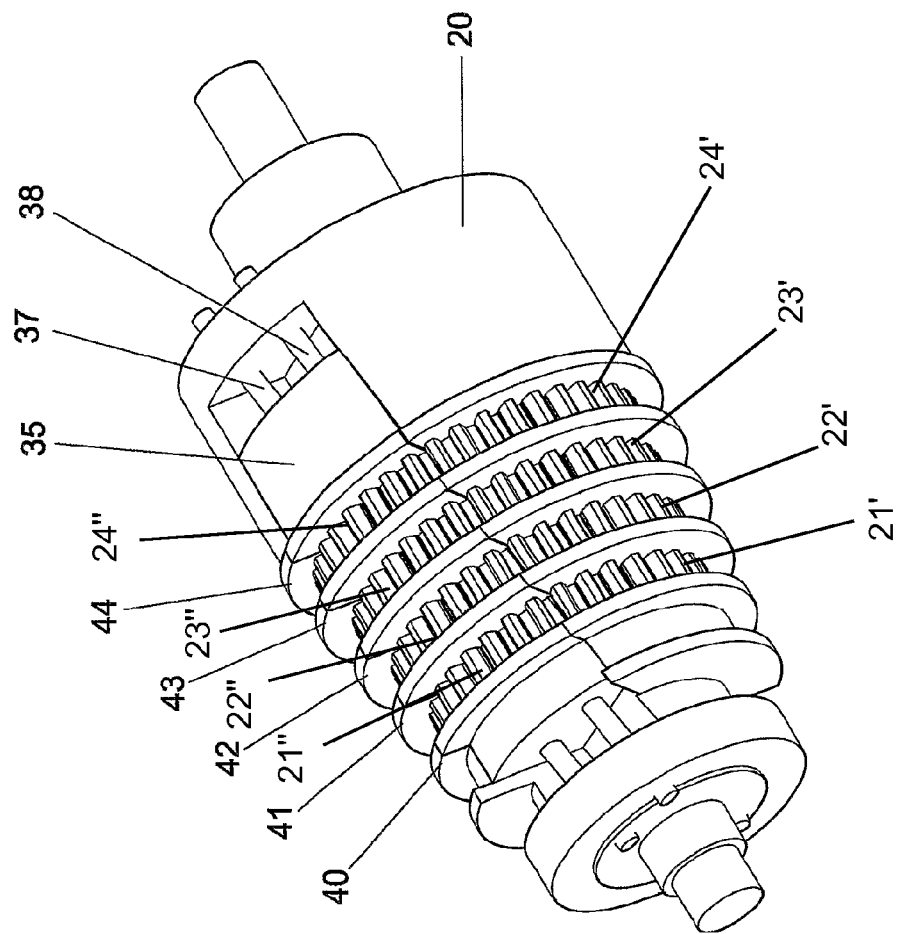
FIG. 6 is a perspective view of the embodiment demonstrated in FIG. 5, with the elevators in their neutral positions on the central gear.

In this embodiment each composite gear consists of a body 21', 22', 23', 24' and two displaceable parts 21", 22", 23", 24" (FIG. 6 only shows one such displaceable part for each gear, while FIG. 5 shows two). The central gear is manufactured in such a way so that two portions of it, which include the displaceable parts of all composite gears, can slide up or down along the central gear, that is from the narrower to the wider part or the other way around, in such a way that, along the respective imaginary line of best alignment, the teeth of any displaceable part can be aligned to the teeth of the body of another composite gear so that a complementary gear can rotate along from one to the other uninterrupted while still being engaged to them, Each such portion of the central gear is being referred to as an 'elevator'. Each elevator can be supported in a variety of ways. One way is for the elevator to possess longitudinal protruding elements which fit in channels in the main body of the central gear, thus enabling a sliding movement as required. Another way, which is the way chosen for this embodiment, is to employ two axles for each elevator, for example 37 and 38 as shown in FIG. 5, both axles of each elevator being parallel to their corresponding imaginary line of best alignment, in this case represented by number 6.

In this embodiment, each elevator can be envisaged as a section cut off from the main central gear by utilizing a wire of length equal to the elevator, which, starting from the imaginary line of best alignment and while being kept parallel to the imaginary line of best alignment, was moved from outside inwards towards the axis of the central gear for a certain distance, then was moved in a roughly tangential direction for another distance and then was moved away from the axis and brought out through the surface of the central gear. In fact a method which can be used to construct the central gear, could involve wire-cut electrical discharge machining, from now on referred to as 'WEDM'. First the central gear is produced as one piece. Then, the elevators are cut off using WEDM as already described. The elevators are then shortened accordingly. If the mode of support of the elevators would involve axles as in the embodiment described, then support components are added at either end to support the axle ends. If the mode of support of the elevators would involve longitudinal protruding elements which fit in channels in the main body of the central gear then the wire is still kept constantly parallel to the imaginary line of best alignment but the cutting path is deviated accordingly to include these features too.

Figure 7:
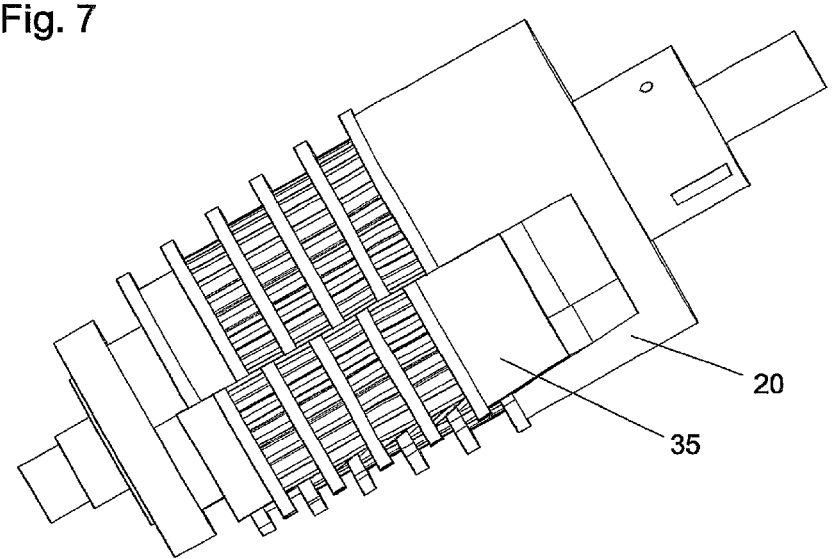
FIG. 7 demonstrates a central gear with one elevator displaced part of the way towards the narrower part of the central gear.
Figure 8:
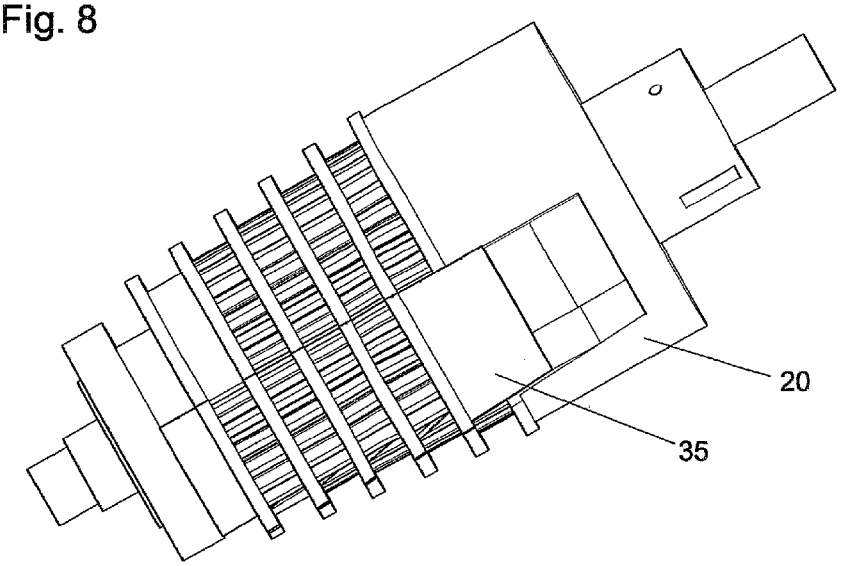
FIG. 8 demonstrates the same central gear with the elevator displaced by one step towards the narrower part of the central gear.

FIG. 5 shows a perspective view of the central gear with axles 37, 38 of one elevator in place but both elevators 35 and 36 moved away from the central gear to better demonstrate its structure. FIG. 6 shows a perspective view of the central gear with the axles, for example 37, 38 and the elevators, for example 35, in place. FIG. 7 demonstrates one elevator 35 displaced part of the way towards the narrower part of the central gear 20. FIG. 8 demonstrates the same elevator 35 displaced by a full one step towards the narrower part of the central gear 20. When the elevator is not in its neutral position, on the side of the elevator away from the imaginary line of best alignment and along the secondary sites of the displaceable parts, a step is formed. The control mechanism ensures that by the time the complementary gear would rotate across that side, the elevator is always in its neutral position and therefore there is no longer a step. During standard rotation the elevators are kept in their neutral position by springs and blocking mechanisms, not shown in the diagrams. In other variations of this embodiment, a locking mechanism can also be used.

Two complementary gears, 25 and 26 in FIG. 1 and FIG. 2, are engaged to the central gear. Their corresponding shafts are numbers 27 and 28. Each complementary gear is attached in a non-rotatable manner, in relation to its shaft, so that it always rotates together with its shaft but is axially moveable and is free to slide along its shaft as needed, during gear-change. Any method or arrangements can be used to allow this kind of movement. In this embodiment this is achieved through the use of a key axle/keyway arrangement 39, 40, as shown in the diagram in FIG. 1 and FIG. 2. During ordinary function one of the complementary gears, for this demonstration the first complementary gear 25, acts as the input gear, and its shaft 27 is the input shaft. Rotational movement from the input shaft 27 is transferred to the complementary gear 25. The complementary gear teeth mesh with the teeth of one of the composite gears on the central gear. In FIG. 1 and FIG. 2 the first complementary gear 25 meshes with the third composite gear 23. Therefore rotational movement is transferred to the central gear. The second complementary gear 26 is also meshed with another composite gear and in FIG. 1 and FIG. 2 it is meshed with the second composite gear 22. Rotational force is therefore transferred to the second complementary gear 26 and through the key axle/keyway arrangement to the second shaft 28.

Figure 9:
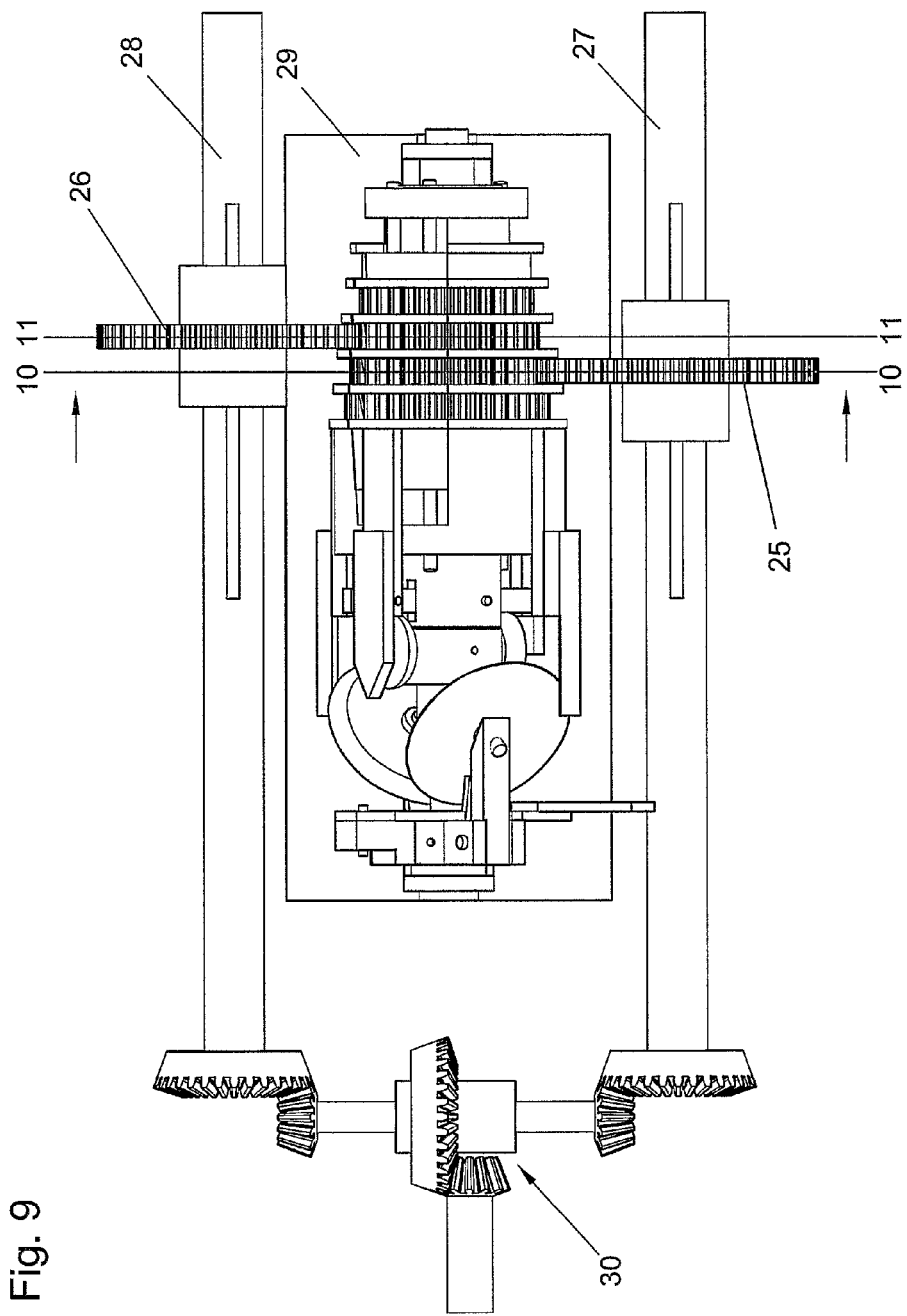
FIG. 9 is a top view of the embodiment in FIG. 1 and demonstrates the position of the cross sections to be demonstrated in FIG. 10 and FIG. 11.

FIG. 9 demonstrates the embodiment shown in FIG. 1 and FIG. 2 as seen from above. Two cross sections have been taken along lines 10 and 11 and they are demonstrated in FIG. 10 and FIG. 11 respectively, being viewed in the direction of the arrows as shown in FIG. 9. Both FIG. 10 and FIG. 11 show the two axles 27 and 28 and their corresponding key axles 39 and 40. Cross sections of the frame 54 as well as part of the base 29 are also shown. The cross sections of the central gear demonstrate the third composite gear 23 in FIG. 10 and the second composite gear 22 in FIG. 11. Each composite gear consists of the body and two displaceable parts. Each displaceable part forms part of the corresponding elevator 35 and 36.

During ordinary function each complementary gear is held from sliding off the composite gear it is engaged to, by part of the control mechanism. In this embodiment, this function is performed by discs embodied in the central gear, as shown in FIG. 6 numbers 40, 41, 42, 43, 44. The discs are situated in between the composite gears and they have a larger diameter than the composite gears as shown in FIG. 6, so that they prevent the complementary gear from shifting from composite gear to composite gear. The portions of each disc which are next to the displaceable parts are detached from the rest of the disc and form parts of the corresponding elevator. At the cut edges of the discs, where the elevators separate from the body, the edges can be filed away in a slanted fashion (not shown in the diagrams). In this way the discs can aid in aligning the complementary gears to the corresponding composite gears during gear change.

Change of gear, up or down can be achieved by the use of the control mechanism and the support structures. Any mechanism can be used as long as it ensures that when gear-ratio change is required, there is displacement of the elevators, in association with the rotation of the central gear and closely related to it. For example, when gear-ratio change is needed, a suitably shaped structure can be employed, the structure being moved to intercept an extension fixed to one of the elevators of the central gear, in such a way so that the extension and thus the elevator are displaced accordingly. The mechanism must also ensure that the process is an all-or-nothing process and that once displacement of an elevator is initiated it will be completed.

In this embodiment, near the wide side of the central gear as shown in FIG. 1 and FIG. 2, two conical discs 45 and 46, which can be envisaged as portions of cones, are supported tilted by support rods 56 and 57, in such a way that during ordinary rotation of the central gear, they do not come in contact with extensions attached to the elevators (for example 47) or the body (for example 48) of the central gear. The support rods are pivoted on a support component 58. In this embodiment the support rods are held in their neutral position by springs which are not shown in the figures. The gear selector lever 50 comprises a handle and at least two arms, FIG. 1 numbers 51 and 52. The gear selector lever is pivoted on support component 58. The support component 58 is fixed on support rod 55 which itself is fixed to the support frame 54. The central gear is supported between the support rod 55 and the opposite side of frame 54 in such a way that it can rotate around its own axis freely. When gear change is needed, the handle of the gear selector lever is moved, one of the arms of the gear selector lever, pushes on, directly or through a spring (not shown on the diagrams), and displaces the corresponding support rod outwards, which then displaces the corresponding conical disc. The outer edge of the conical disc in turn, intercepts the extension attached to one of the elevators and as rotation continues, pushes on it and causes displacement of the extension and the elevator. The conical disc is supported at such an angle, so that once it intercepts the extension, it remains in the displaced position until the process is completed. An alternative arrangement, to be used in other embodiments, is the use of an independent member rotating with the central gear, this member acting as a lever in such a way that when intercepted and pushed away by the tilted disc, it transfers the force through a leverage system to the active elevator.

Figure 12:
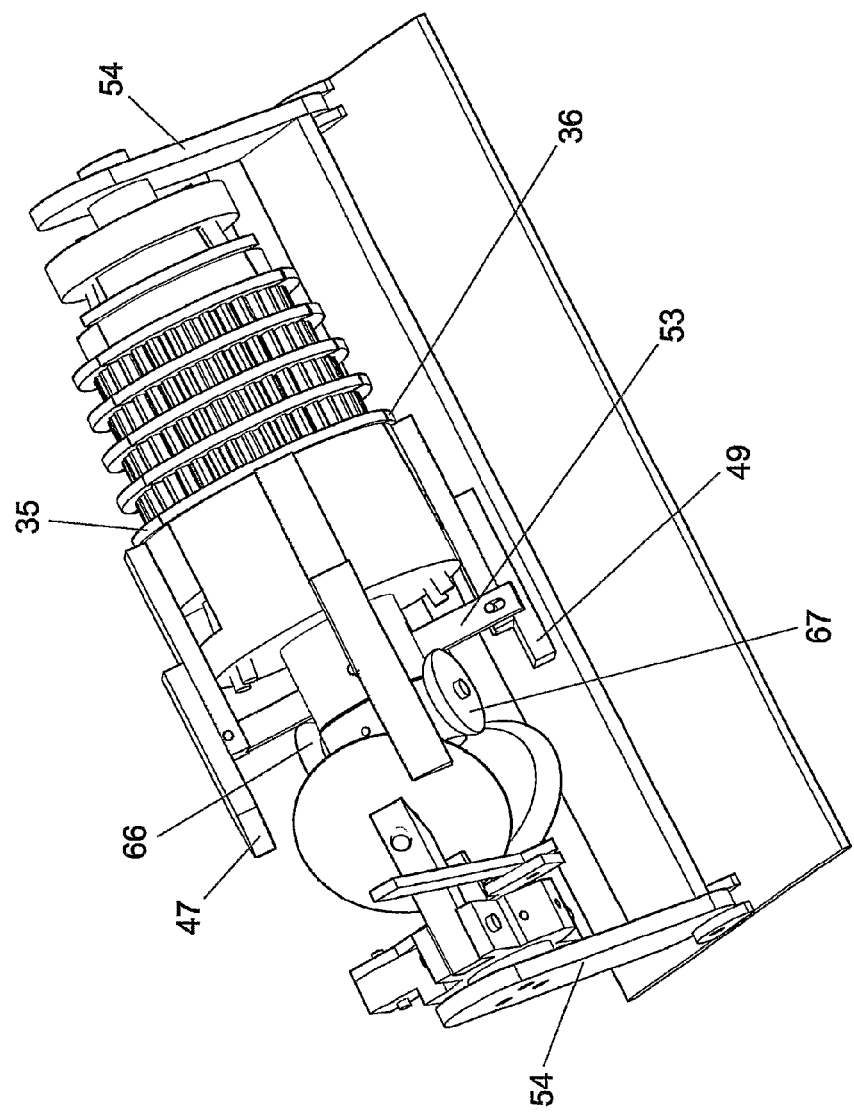
FIG. 12 is a perspective view of the embodiment demonstrated in FIG. 1 seen from a different angle and without the complementary gears and the differential assembly, to better demonstrate some of the components of the control mechanism.

A control rod 53 as best seen in FIG. 12 and FIG. 2, placed near the wider part of the central gear is attached to the extensions 47 and 49 of both elevators in such a way so that it can control the movement of the elevators. It is extending in the diametral direction of the composite gears and pivoted so that its axis is perpendicular to the axis of the central gear and so that it can rotate for a few degrees back and forth thus forcing the elevators to slide in opposite directions.

In the embodiment of the invention currently described, elevator 35 which is attached to extension rod 47 is the active elevator. This is because any displacement of this elevator is caused by one of the conical discs, intercepting extension 47, as this rotates together with the elevator. Thus the extension and the active elevator are displaced towards the narrower part of the central gear. The other elevator 36 is called the passive elevator because it is displaced by control rod 53 towards the wider part of the central gear and this occurs only when the active elevator is displaced. Therefore, in this embodiment, whenever gear-ratio change is required, the active elevator always moves towards the narrower part of the central gear and the passive towards the wider. Movement of the active elevator towards the wider part of the central gear is never necessary in this embodiment and can be obstructed in a variety of ways. One way is for the elevator to be longer on that side. Another way, employed in this embodiment, is by the insertion of appropriately sized tubes over the axles of the active elevator on the wider side of the central gear. These tubes stop the active elevator in the neutral position. Springs are placed over the axles of the active elevator near the narrow side of the central gear and these keep the active elevator in the neutral position, during normal operation. For the sake of clarity the tubes and the springs are not shown in the diagrams. Similarly, not shown are excavations in the central gear and the active elevator to accommodate for the length of each spring when the spring is compressed during gear change. The arrangement of tubes and springs is exactly the reverse in the case of the passive elevator.

In a different embodiment of the invention employing one central gear and one complementary gear, the support structures would have to be designed in such a way that they would keep the axis of rotation of the central gear parallel to the shaft of the complementary gear, while at the same time allowing the axis and the shaft to move apart or approach each other according to whether the complementary gear engages a wider or narrower composite gear, on the central gear. In the currently described embodiment, where two complementary gears are employed, the support structures hold the shafts of the two complementary gears parallel to each other and at a constant distance. In this embodiment, as one complementary gear shifts towards a wider composite gear, the other shifts towards a narrower composite gear. Thus, the distance between the shafts of the two complementary gears does not need to change. However, the central gear has to move nearer to, or further away from, each complementary gear as the case may be. The support structures support the axle of the central gear in such a way that it remains parallel to the shafts of the complementary gears but can move nearer to one or the other. Ideally the axle of the central gear and the shafts of the complementary gears should also remain in the same plane. The support structures therefore include a mechanism that permits this kind of motion. However, as, long as the axle of the central gear is kept parallel to the shafts of the complementary gears the invention can tolerate small deviations from the same plane. Therefore, one embodiment of the invention can include a frame 54 shown in FIG. 1 and FIG. 2 which with the use of support rod 55 attached to the frame, supports the axle of the central gear, while the frame itself is pivoted on the base 29, as shown in the diagrams and can swing from one direction to the other thus allowing the axle to swing from one shaft towards the other, The frame 54 is also shown better in FIG. 12.

Figure 13:
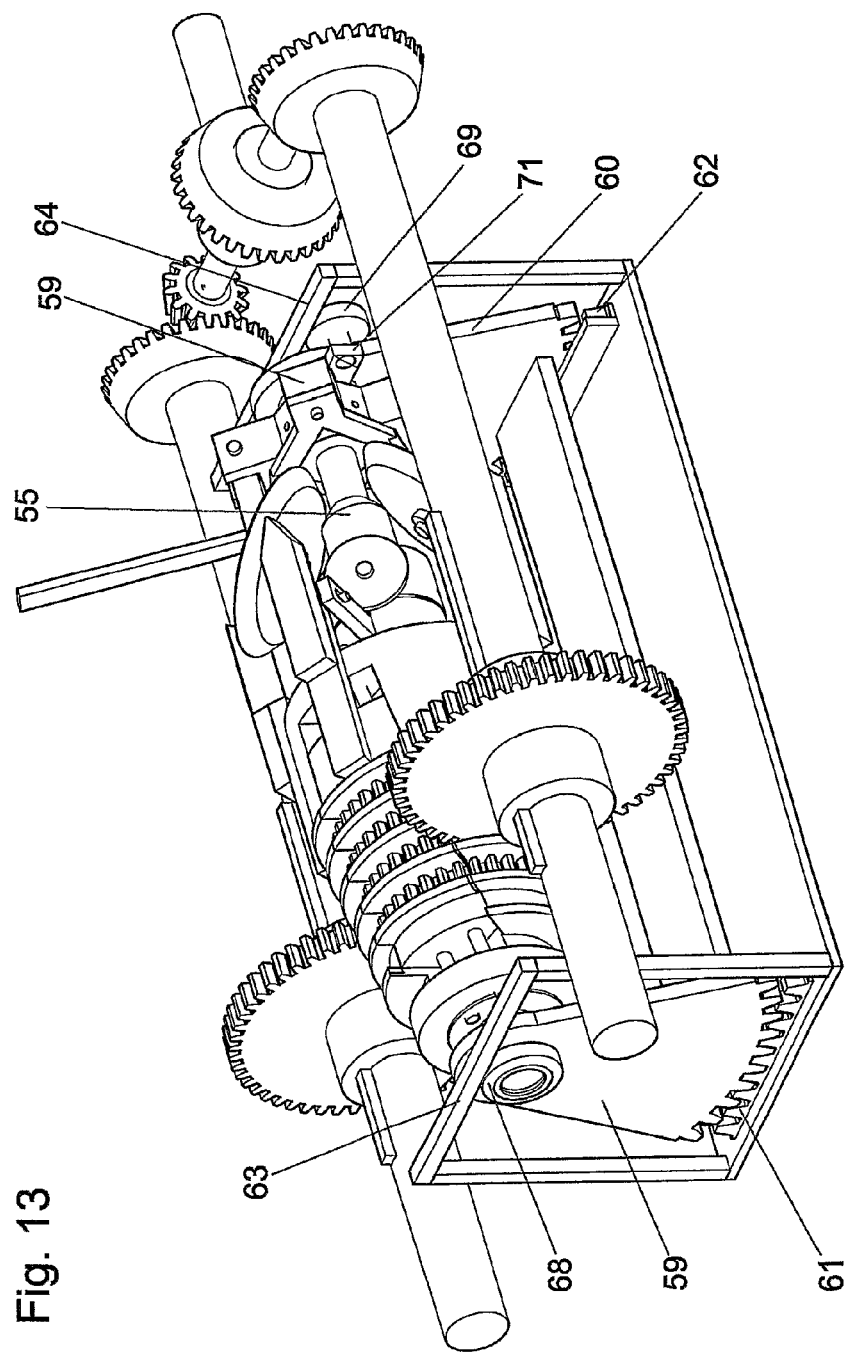
FIG. 13 is a perspective view of another variation of this embodiment, with a more ideal but more complex support-structure.
Figure 14:
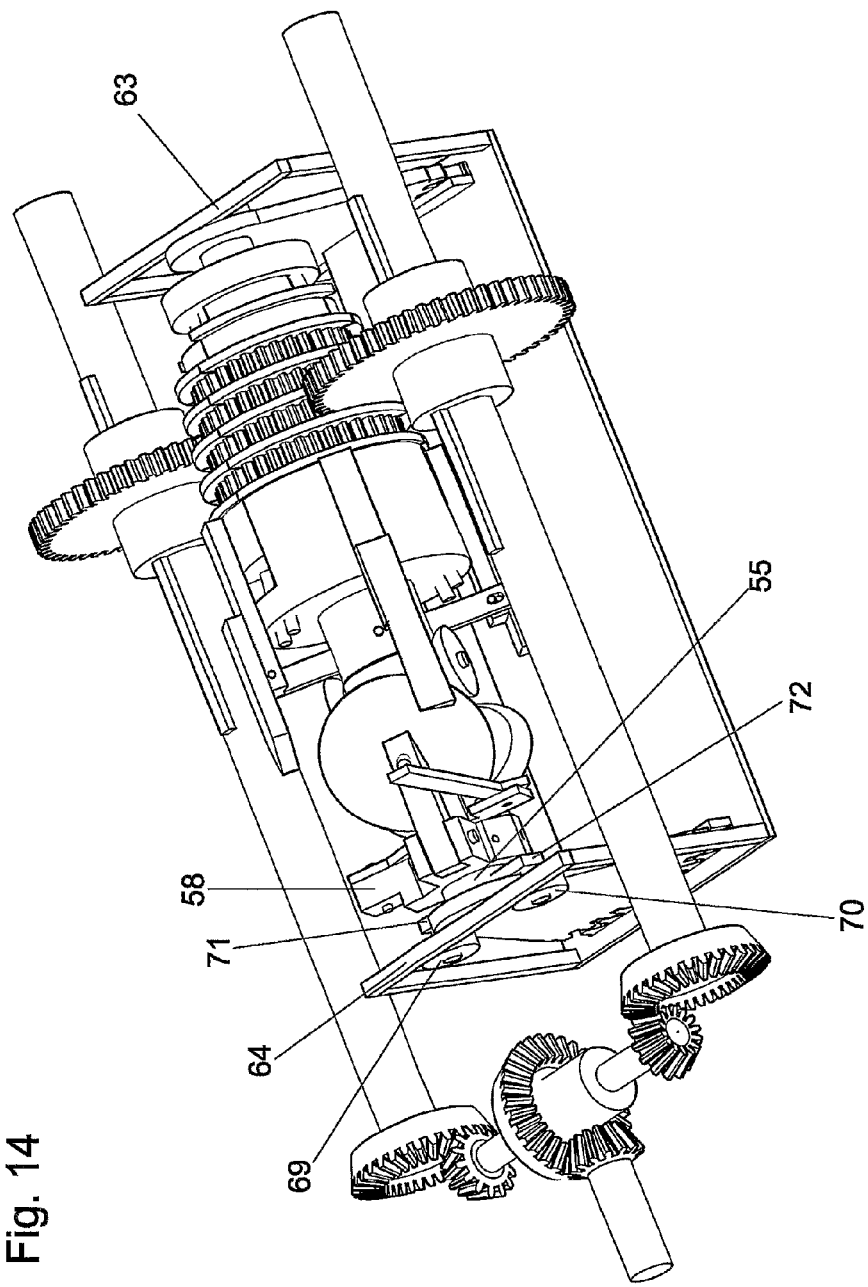
FIG. 14 is a perspective view of the embodiment demonstrated in FIG. 13, seen from a different angle.

A more ideal but more complex support structure which can be used with another variation of this embodiment is shown in FIG. 13 and in FIG. 14. In this variation, the axis of the central gear is supported by a frame which on each side consists of a gear portion 59 and 60 as shown in FIG. 13. Each gear portion meshes with a rack gear 61 and 62. The radius of each gear portion is equal to the distance between the axis of the central gear and the rack gears. Any arrangement can be used to keep the frame and the rack gears in mesh. In the embodiment shown in FIG. 13 and FIG. 14, two sliding rods 63 and 64 are used. On one side as shown in FIG. 13, a ring shaped component 68, rotatably attached to the frame at a point corresponding to the axis of the central gear, rolls along sliding rod 63. On the other side as best shown in FIG. 14, two ring shaped components 69 and 70 are rotatably attached to two corresponding members 71 and 72 which are themselves attached to support rod 55 and they roll along sliding rod 64. In this variation, support rod 55 is not firmly attached to the frame supporting the central gear. Instead it is rotatably attached to it by being mounted on a rod firmly attached to gear portion 60, With the help of ring shaped components 69 and 70 and sliding rod 64, support rod 55 maintains its spatial orientation as it shifts from one complementary gear shaft to the other. In this way, all the other components attached to it, keep their spatial orientation too. The whole arrangement described above, is one way of keeping the axis of the central gear both parallel to the shafts of the complementary gears and in the same plane as they are, while permitting movement towards and away from each of them.

This invention can be used in various embodiments. In one embodiment already described which involves two complementary gears, one complementary gear represents the input gear, the central gear represents a slave gear while the second complementary gear represents the output gear. With regard to moving a vehicle from stand-still, this transmission has the same disadvantages as most of the transmissions of the prior art, with the need to use a clutch, torque converter etc. To overcome this drawback we can employ a differential gear 30 as shown in FIG. 1 and FIG. 2. Differential gears are well known in the prior art and will not be described further. In this embodiment, one of the complementary gears still acts as the input gear 25, The central gear 20 still functions as a slave gear. The second complementary gear 26, however, is no longer the output gear. Instead it takes the role of an intermediate gear. With the use of bevel gears 72 and 73, rotary power is transmitted from the intermediate gear shaft 28 to one of the half-axles 74 of the differential gear 30. Similarly with the use of bevel gears 75 and 76, rotary power is transmitted from the input gear shaft 27 to the second half-axle 77 of the differential gear 30. The output shaft 65 is attached to a bevel gear 79 whose teeth mesh with the teeth of the Crown wheel 78 of the differential gear.

In this specific embodiment as shown in FIG. 1 and FIG. 2 and with the complementary gears in the positions shown, that is, the first 25 with 54 teeth meshed with the third composite gear with 36 teeth and the second 26 with 51 teeth meshed with the second composite gear with 34 teeth, the gear ratio between the input shaft 27 and the intermediate shaft 28 is 1:1. When the complementary gears are in this position the output shaft 65, meshed with the crown wheel of the differential gear does not rotate, irrespective of the speed of rotation of the input gear. If we use a motor vehicle as an example, in this state of the transmission the engine would be running at any rotational speed but the wheels would be held stationary by the transmission. Forward and backward movement would only be achieved by changing gear-ratio.

For the sake of this description we will call clockwise rotation the rotation of the input gear 25, as viewed in FIG. 1 and FIG. 2, in such a way that would make the side of the central gear meshed with it move towards the base 29. When the input shaft 27 and gear 25 rotate clockwise the central gear 20 rotates counter-clockwise. When down gear shift is sought the gear selector lever handle 50 is pushed in a clockwise direction. This pushes the disc support arm 56 and therefore the tilted disc 45 outwards and it in turn intercepts the extension 47 of the active elevator 35 as it rotates past it. In doing so the conical disc rotates and the extension and the elevator are pushed towards the narrower side of the central gear. Through the control rod 53 (FIG. 1, FIG. 2 and FIG. 12) attached to the extensions of both elevators the passive elevator is pulled towards the wider part of the central gear. At the point of maximum displacement, the displaceable part of the forth composite gear 24 on the active elevator, is aligned to the main body of the third composite gear 23 and as rotation continues the first complementary gear 25 which was engaged to the third composite gear 23 rolls across and engages the displaceable part of the forth composite gear 24 on the active elevator. At the same time the second complementary gear 26 which is engaged to the second composite gear 22 on the main body rolls onto and engages the displaceable part of first composite gear 21 on the passive elevator. As rotation continues the control rod 53 is intercepted by rectification disc 66 (FIG. 1 and FIG. 12). Rectification disc 66 and disc 67 are rotatably attached to a component which is itself fixed on support rod 55. The two discs have rotational symmetry of 180 degrees. When the control rod 53 is intercepted by rectification disc 66 it is pushed towards the neutral position pushing and pulling both the active and the passive elevators to their neutral positions. With the help of disc 67 the control rod is held in the neutral position at the phase of the cycle where the complementary gears would roll off the elevators and onto the main body of the central gear. Thus rotation continues with the first complementary gear on the forth composite gear 24 and the second complementary gear on the first composite gear 21. This represents a gear ratio of 1:0,89. The output shaft 65 rotates in a direction which if it were for a motor vehicle would represent the rear gear. In this embodiment the extension on the passive elevator is shorter and is never intercepted by the conical discs. Its function is to provide a link with control rod 53 and also, by having a weight equal to that of the extension on the active elevator, provide balance during rotation of the central gear at high speed. The extensions fixed to the body of the central gear are longer than the other extensions and can not be intercepted by the conical discs. Their function is to force the conical discs back to their neutral positions after gear change.

When up gear-shift is sought the gear selector lever is pulled in a counter-clockwise direction, The extension of the active elevator is intercepted by the lower tilted disc 46 and is pushed again towards the narrower part of the central gear. Through the movement of the control rod 53, the passive elevator moves in the opposite direction as before. The difference of the up-shift from the down-shift procedure is that at maximum displacement it is the second complementary gear 26 that engages the active elevator. Therefore the second complementary gear rolls on from first composite gear 21 on the main body to the second composite gear 22 on the active elevator. The first complementary gear 25 rolls on from the forth composite gear 24 on the main body to the third composite gear 23 on the passive elevator and therefore as rotation continues when both elevators return to their neutral positions the complementary gears are left meshed with the second and third composite gears 22 and 23 and the gear ratio is back to 1:1. The output gear 65 is thus stationary and in a motor vehicle this would mean that the gear-box has halted the vehicle. Further up shift moves the first complementary gear to the second composite gear 22 and the second complementary gear to the third composite gear 23 offering a gear ratio of 1:1,12. In a motor vehicle this would represent the first forward gear. Further up-shift moves the first complementary gear 25 to the first composite gear and the second complementary 26 gear to the forth composite gear 24 thus offering a gear ratio of 1:1,26. In a motor vehicle this would represent the second forward gear. The gear ratios mentioned above are given by way of example only, just to demonstrate the principles of this invention and are not intended to be limiting in any way.

Gear-shift beyond the upper or lower limits must be prevented to avoid damage to the transmission. This can be achieved in many ways including the use of the electronic circuitry which would control the movements of the gear selector lever and thus the gear-ratio changes, in a motor vehicle. In the embodiment shown above this is achieved in a mechanical way by the use of two mechanical structures (not shown in the diagrams), fixed to the support structures and the base of the transmission. One mechanical structure which prevents down gear-shift beyond the lower limit is placed in such a way that the handle of the gear selector lever touches on it, when input complementary gear 25 is engaged to the forth composite gear 24. Thus further clockwise rotation of the handle is prevented. Counter-clockwise rotation of the handle is not prevented and thus up gear-shift can be performed. With each up gear-shift action, the body of the central gear together with support rod 55 move closer to the input shaft 27. By the time input complementary gear 25 gets engaged to the first composite gear 21, the central gear moves nearer the input shaft 27 enough for the handle of the of the gear selector lever to touch the second mechanical structure, which prevents further counter-clockwise rotation of the handle and thus prevents further up gear-shift beyond this point.

MODES FOR INVENTION

The embodiments described above were described just to demonstrate the main features of the invention. The invention is very versatile and the ideas and methods described can be embodied in a multiplicity of ways. In other embodiments, more forward and rear gear ratios can be offered by either involving more active composite gears or by employing more transmissions (embodiments of this invention) in series or in parallel or any combination between them. The step between each gear change can be increased by increasing the difference in diameter between each composite gear. This can be achieved by either increasing the difference in the number of teeth between each composite gear or by making the teeth larger. The step between each gear change can be decreased by doing the reverse. The step between each gear change can also be increased by arranging so that the elevator shifts by more than one step at a time.

The disclosed methods and devices can ensure gear-ratio change without the need to use clutches or torque converters. However, in embodiments where the gear-change steps are large, in order to ensure smoothness, one or more clutches and torque converters may have to be used in the power train, before or after a transmission based on this invention. In an effort to eliminate the need for clutches and torque converters completely, in the case of a motor vehicle, a manufacturer may wish to have very small gear-change steps. Alternatively he may choose to have very small gear-change steps during vehicle launch and larger gear-change steps later on, when the vehicle would be travelling at a higher speed. In such a case, two embodiments of the invention could be used in series. One embodiment could have small gear-ratio steps and could be used at vehicle launch while keeping the gear-ratio constant in the second embodiment. When maximum gear-ratio is reached in the first embodiment, further gear-ratio changes could be performed in the second embodiment.

As mentioned earlier on, despite the fact that the name of the invention is gear-based continuously engaged variable transmission, referred to as 'GCEVT', the name demonstrates capabilities of the invention and is not intended to be limiting. For example, in some embodiments, the composite and complementary gears could possess friction surfaces instead of gear-teeth.

An embodiment of this invention could also be used in combination with any other transmission and any sort of other gearing. For example if the transmission is used in a motor vehicle and a differential assembly is not used, extra gearing can be included to provide forward and reverse motion.

The rate of gear-ratio change is directly proportional to the rate of rotation of the composite gears. If the transmission is to be used in a vehicle where the manufacturer desires the rate of gear-ratio change to be slower, then step down gearing can be used between the source of rotational motion and the transmission, thus decreasing the relative rate of rotation of the composite gears of the transmission. Corresponding step up gearing can then be used between the transmission and the destination of the rotational motion.

INDUSTRIAL APPLICABILITY

A gear-based continuously engaged variable transmission, GCEVT and the methods and devices disclosed so far should have applicability in any mechanical and electromechanical or other device where a variable transmission is currently being used or could be used in the future. They could also be used in machine tools and as a means of adjusting main rotor speed on helicopters. Motor vehicles are another very good example. Its use should offer higher flexibility, better performance, lower fuel consumption and reduced emissions, combined with less wear and tear and lower cost of production. This invention should be especially useful in electric cars and hybrids where quick, exact and frequent changes in gear-ratio are of paramount importance to permit generation of electricity during downhill travel and deceleration. It should also be useful, in general, wherever an electric motor has to be used. This is because it could permit the motor to start rotating initially without load, thus avoiding all the problems associated with starting a motor with load.

A device based on this invention can also be used to distribute rotational speed between the wheels of a vehicle. For example, rotational motion coming out of a vehicle motor, after being modulated through an embodiment of this invention can be transferred directly to the axle for the rear wheels and to a second embodiment of this invention intended to supply rotational motion to the front wheels. A control device like a computer, fed information from sensors recording the vehicle speed and acceleration, the speed of rotation of all the wheels as well as the degree and direction of turning of the steering wheel, could calculate if the rotational motion supplied, to the front should be higher or lower than that transferred to the rear, and could change the gearing in the second embodiment of this invention to achieve the right ratio. Similarly, rotational motion from the rear axle could be transferred to one of the rear wheels directly and to the other via a third embodiment of this invention. This would allow the control device to change the gear-ratio as needed to give each wheel the correct rotational speed according to the degree and direction of turning of the steering wheel and other parameters. A similar arrangement could be employed for the front wheels.

While the invention has been described with reference to exemplary embodiments thereof, it is to be understood that the invention is not limited to the exemplary embodiments. The applicant also reserves the right to claim additional combinations of characterizing features that have been disclosed only in the description and/or the drawings. Because the characterizing features disclosed in any part of this application including those contained in the sub-claims, can represent independent inventions on the priority date with respect to the prior art, as single entities or as combinations, the applicant reserves the right to obtain further protection both in the form of further claims and in the form of applications for independent inventions.

The invention claimed is:

1. A device comprising at least a first composite gear (23), a second composite gear (22) and a first complementary gear (25), the first composite gear and the second composite gear being connected to be adjacent to and coaxial with one another on a common central axis, each composite gear having a body and a displaceable part that can be displaced relative to said body in a direction parallel to an imaginary line of best alignment that allows the displaceable part of one composite gear to align with the body of the adjacent composite gear, the first composite gear (23) and the first complementary gear (25) being engaged with one another and transferring rotational motion, the displaceable part of the first composite gear comprising an engaging surface for engaging with the first complementary gear (25), the displaceable part of the first composite gear (23) being mounted so as to be functionally alignable, at a first alignment site, to the body of the second composite gear (22), wherein the first complementary gear (25) when engaged to the displaceable part of the first composite gear (23) is connected and configured to rotate across onto the body of the second composite gear (22) after displacement.

2. The device according to claim 1, further comprising at least one additional composite gear coaxial with the first composite gear and the second composite gear, and each of said at least one additional composite gear having a body and a displaceable part that can be displaced in a direction parallel to the imaginary line of best alignment,
wherein at least one of the second composite gear and the at least one additional composite gear have a different diameter to the first composite gear (23),
wherein the first complementary gear (25) has a corresponding shaft, and is connected to be displaceable and engageable with any of the first composite gear, the second composite gear and the at least one additional composite gear, in turn,
wherein all composite gears are fixed to rotate together on the common central axis, forming an assembly, the assembly forming a central gear (20), and
wherein the corresponding displaceable parts of the first composite gear, the second composite gear and the at least one additional composite gear are aligned with each other and are connected to be displaceable as a group, the group forming an elevator.

3. The device according to claim 2, wherein the engaging surface is a friction surface.

4. The device according to claim 2, wherein the size and shape of the displaceable parts and the nature of the engaging surface are such that the engaging surface of the displaceable part of the first composite gear (23) is functionally aligned to an engaging surface of the body of the second composite gear (22), at the first alignment site and at a second alignment site, in a manner sufficient to allow the first complementary gear (25) to rotate across both sites of alignment.

5. The device according to claim 4, wherein the composite gears are of increasing diameters in a progressive and stepwise manner and the corresponding displaceable parts of all the composite gears are aligned with each other so that they can be displaced together, and wherein when a gear-shift is executed, the first complementary gear (25) can be displaced together with and while engaged to whichever displaceable part was engaged to the specific composite gear at the time.

6. The device according to claim 2, wherein the size and shape of the displaceable part of each composite gear and the nature of the engaging surface are such that when the engaging surface of the displaceable part of one composite gear is functionally aligned to the engaging surface of the body of another composite gear, the engaging surfaces of the displaceable parts best align at the first alignment site thus allowing the first complementary gear to rotate across between adjacent composite gears, and does not functionally align in such a way as to allow the first complementary gear to rotate across at a second alignment site.

7. The device according to claim 6, wherein the direction of rotation of the complementary gear (25) relative to each displaceable part is from the second site towards the first site and wherein a change of gear-ratio is achieved by displacement of the displaceable parts and alignment of each displaceable part with a different composite gear while the complementary gear (25) is engaged with one of the displaceable parts, the change of gear-ratio being completed before the complementary gear would reach the first alignment site, followed by displacement of the displaceable parts back to neutral positions after the complementary gear has engaged the body of the composite gear and before the complementary gear could engage one of the displaceable parts again.

8. The device according to claim 6, wherein a direction of rotation of the first complementary gear relative to each displaceable part is from e first alignment site towards the second alignment site and wherein change of gear-ratio is achieved by displacement of the displaceable parts and alignment of each to a different one of the first composite gear, the second composite gear and the at least one additional composite gear while a corresponding complementary gear is engaged to the body of one of the composite gears, and displacement back to a neutral position while the first complementary gear is engaged to one of the displaceable parts and before the first complementary gear could reach the second alignment site.

9. The device according to claim 2, wherein:
the first composite gear, the second composite gear and the at least one additional composite gear have step-wise increasing diameters, each possessing an even number of displaceable parts, there being rotational symmetry in the disposition of the displaceable parts on each composite gear, with reference to the central axis of the central gear (20);
and the device further comprising a second complementary gear (26) with a corresponding shaft, the first complementary gear provided on a first side of the central gear (20) and the second complementary gear provided on a second side of the central gear (20), the corresponding shafts of the first complementary gear and the second complementary gear being parallel to the central axis of the central gear (20), each complementary gear being configured so as to rotate together with the corresponding shaft and slide along an axis of rotation whenever there is gear-ratio change;
the two complementary gears (25, 26) being engaged to the central gear (20), each at a corresponding equal but opposite distance from a center of the central gear such that when one of the complementary gears is engaged to a wider end of the central gear (29) the other complementary gear is engaged to a narrower end;
the axle of the central gear (20) being supported parallel to the corresponding shafts of the complementary gears (25, 26), but connected so that the central gear can shift nearer to one or the other of the complementary gears according to the position of engagement of the complementary gears (25, 26) on the central gear (20); and
wherein a change of gear is done utilizing displaceable parts with rotational symmetry of 180 degrees, in relation to an axis of the central gear (20), in such a way that when one complementary gear shifts towards the narrower part of the central gear (20), the other complementary gear shifts towards the wider part of the central gear (20) so that a distance between axes of the complementary gears remains constant.

10. The device according to claim 2, wherein the engaging surfaces are comprised of teeth, which are gear-teeth or other geometrical shapes, and wherein:
the teeth of the engaged gears, are complementary thus facilitating transfer of rotational motion;
the rotational orientation of the engaging surface on each composite gear on a central gear (20) being such that at least one set of teeth, comprising one tooth from each composite gear, or the corresponding space between teeth are aligned along the first imaginary line of best alignment such that, near the first imaginary line of best alignment, the corresponding teeth of each composite gear are also aligned at second imaginary lines of alignment, which together with the first imaginary line of best alignment form at least one band of alignment on each central gear (20); and
wherein an imaginary line of alignment is formed for each elevator (35, 36), joining the first and second sites of alignment of the displaceable parts that constitute the elevator (35, 36), where each such line lies within a band of alignment and parallel to, or on, one of the second imaginary lines of best alignment or the first imaginary line of best alignment.

11. The device according to claim 10, wherein:
the composite gears have step-wise increasing diameters and possess a number of gear teeth, the difference in the number of gear teeth between each consecutive composite gear being an even number;
wherein rotational symmetry is provided in the disposition of the displaceable parts on each composite gear, with reference to the common central axis of the central gear (20);
the device further comprising a second complementary gear with a corresponding shaft, the first complementary gear provided on a second complementary gear side of the central gear (20) and the second complementary gear provided on a second side of the central gear (20), the corresponding shafts of the complementary gears being parallel to the common central axis of the central gear (20), each complementary gear (25, 26) rotating together with its corresponding shaft but being able to slide along its axis of rotation whenever there is gear-ratio change;
the first complementary gear and the second complementary gear being engaged with the central gear (20), each at a corresponding equal but opposite distance from a center of the central gear, such that when one of the first or second complementary gears is engaged to a wider end of the central gear (20) the other of the first or second complementary gears is engaged to a narrower end;
the shaft of the central gear (20) being supported parallel to the corresponding shafts of the first and second complementary gears (25, 26), and connected to shift nearer to one another according to a position of engagement of the first and second complementary gears (25, 26) on the central gear (20);
a change of gear being done utilizing displaceable parts and elevators (35, 36) with rotational symmetry of 180 degrees, in relation to the common central axis of the central gear (20), such that when one of the first and second complementary gear (25, 26) shifts towards a narrower part of the central gear (20) the other of the first and second complementary gears shifts towards the wider part of the central gear so that the distance between the axes of the first and second complementary gears (25, 26) remains constant;

further comprising structures (40-44) with rotational symmetry, included in the central gear (20), and as necessary complementary structures in the first and second complementary gears (25, 26), which keep the composite gears and the first and second complementary gears (25, 26) aligned during ordinary rotation and force the first and second complementary gears (25, 26) to move with the displaceable parts, if they are engaged to the displaceable parts, during a phase in which the displaceable parts are shifted;

further comprising control structures (45, 46) which ensure sliding of the displaceable parts in relation to rotation of the central gear (20), ensuring change of gear-ratio when required and in such a way that once such a procedure is initiated, if the central gear (20) continues to rotate, the change of gear-ratio is always completed; and further comprising casing and support structures ensuring lubrication of all moving parts, either by full or partial immersion in lubricating oil, or by spaying oil on the moving parts.

12. The device according to claim 11, wherein the control structures are configured to control displacement of the displaceable parts moved to intercept an extension (47) attached directly to one of the elevators, in which case such a structure pushes and displaces the extension and the elevator (35), while the other elevator (36) is secondarily displaced in the opposite direction by a lever attached to the other elevator (36) and controlled by the first elevator (35).

13. The device according to claim 12, wherein the control structures comprise tilted discs, parts of cones, ordinarily held in a position and at an angle so that the tilted discs do not intercept the extension attached to the elevator (35) and wherein when gear-ratio change is sought, one of the tilted discs is moved outwards so that an edge of the moved tilted disc intercepts the extension (47) attached to the elevator (35) causing the disc (45) to rotate, push and displace the extension (47) and the elevator (35).

14. The device according to claim 11, wherein the control structures are configured to cause displacement of the elevators (35, 36) moved to intercept an extension attached through levers to one of the elevators, the control structure configured to push and displace the extension and through a leverage system the elevator (35), while the other elevator (36) is secondarily displaced in the opposite direction by a lever attached to the other elevator and controlled by the first elevator (35).

15. The device according to claim 14 wherein the control structures comprise tilted discs, parts of cones, ordinarily held in a position and at an angle so that the tilted discs do not intercept the extension (47) and wherein when gear-ratio change is sought, one of the tilted discs is moved outwards so that an edge of the moved tilted disc intercepts the extension attached through a leverage system to the elevator (35), such that the moved tilted disc rotates and pushes and displaces the extension (47) and the elevator (35).

16. The device according to claim 11, further comprising a frame that supports the common central axis of the central gear (20), the frame being pivotably attached to the casing and support structures such that the common central axis can swing from one complementary gear to the other complementary gear, while being held parallel to the corresponding shafts of the complementary gears (25, 26).

17. The device according to claim 11 further comprising:
a frame that supports the common central axis of the central gear (20), the frame (59, 60) having two ends that are rotatably attached through gear portions and ratchet gears (61, 62) to the casing and support structures, such that the common central axis can shift from the first complementary gear (25) to the second complementary (26), while being held parallel to and in the same plane as the corresponding shafts of the first and second complementary gears; and components supporting the various control mechanisms pivotably attached to the frame (60), in such a way, and with the use of a plurality of units to maintain a spatial orientation, as the common central axis of the central gear (20) swings from the first complementary gear towards the second complementary gear.

18. The device according to claim 1, wherein the device forms a part of a variable transmission.

19. The device according to claim 18, used as part of a variable transmission, wherein the transmission is used in any vehicle.

20. The device according to claim 1, wherein the device is used to distribute and modulate the torque delivered to individual wheels of a vehicle, enabling adjustment of the delivered torque according to various parameters comprising the steering angle, road speed and acceleration of a vehicle, thus providing better traction and vehicle performance and stability.

21. The device according to claim 1 further comprising:
a subtraction device that can bring about subtraction of rotational movement comprising a differential assembly with at least three input-output components, each component connected to, or being part of, the differential assembly, a first half-axle and a second half-axle respectively, wherein a source of the rotational motion is connected through two power-trains to a first and a second of input-output components of the differential assembly respectively;

a gearing or transmission included in at least one of the power-trains;

at least one said device being included in at least one of the power-trains;

an output shaft of the differential assembly being connected to a third input-output component of the differential assembly;

addition of appropriate gearing in either of the power-trains enabling the output shaft to be stationary at least at one gear-ratio state of the device ; and addition of appropriate gearing in either of the power-trains enabling the output shaft to rotate in one or the other direction, by one or more rates of rotation according to the other gear-ratio states of the device.

22. The device according to claim 21, wherein the device forms a part of a variable transmission.

23. The device according to claim 22, wherein the transmission is used in any vehicle.

24. The device according to claim 21, wherein the device is used to distribute and modulate torque delivered to individual wheels of a vehicle, enabling adjustment of the delivered torque according to various parameters comprising the steering angle, road speed and acceleration of a vehicle, thus providing better traction and vehicle performance and stability.

25. A method for manufacturing a device according to claim 1, comprising the following steps:
preparing the central gear comprising more than one composite gears that are fixed to rotate together, with a progressively increasing number of gear teeth between each consecutive gear, where a difference in the number of gear teeth between each consecutive gear is constant and the gears have a rotational orientation in which a number of imaginary lines of best alignment are formed joining, from gear to gear, either rows of teeth or rows of spaces between teeth, the number of lines of best alignment being equal to the difference in the number of teeth between each consecutive gear;

using wire-cut electrical discharge machining and starting from one of the imaginary lines of best alignment and while keeping a wire constantly parallel to the one of the imaginary lines of best alignment, moving the wire from outside inwards towards the common central axis of the central (20) for a certain distance, then moving the wire in a roughly tangential direction for another distance and then moving the wire away from the common central axis and bringing the wire out through a surface of the central gear thus producing an elevator;

if more elevators are required, more elevators are cut in the same fashion;

the elevators are then shortened accordingly;

axle holes are drilled in each elevator, the holes being kept parallel to the corresponding line of best alignment; and support components are added at either end to support the axle ends.

26. A method for manufacturing a central gear according to claim 25, wherein providing support for the elevators using longitudinal protruding elements which fit in channels in the central gear and wherein a cutting path of a wire is deviated accordingly to produce the elevators, without creating holes or support components for axles.

27. A method of changing gear-ratio of a gear, from being engaged to one gear to being engaged to another gear while transferring rotational motion, comprising at least two composite gears and a complementary gear, a first composite gear and the complementary gear being engaged with one another to transfer rotational motion, wherein part of the engaging surface of the first composite gear and the second composite gear form a displaceable part that is displaceable relative to the body of the first composite gear and the second composite gear, respectively, the first composite gear being functionally aligneable, at least at one site, to a body of the second composite gear, wherein the complementary gear, when engaged to the displaceable part of the first composite gear is able to rotate across onto a body of the second composite gear.

28. The method according to claim 27 in which the first composite gear and the second composite gears are of a different diameter.

29. The method according to claim 28, further comprising changing of gear-ratio whenever the displaceable part of the first composite gear is functionally aligned to the second composite gear at only a first alignment site and whenever a relative direction of rotation of the complementary gear is from a second alignment site towards the first alignment site, the method including the following steps:

while the complementary gear is engaged to the displaceable part of an engaging surface of the first composite gear, displacing the displaceable part of the first composite gear together with the complementary gear and aligning the displaceable part of the first composite gear to an engaging surface of the second composite gear, before the complementary gear can engage a body of the second composite gear (22); and after the complementary gear engages the body of the second composite gear, the displaceable part of the first composite gear is displaced back to its original position, before the complementary gear can engage a displaceable part again.

30. The method according to claim 28, further comprising changing the gear-ratio whenever the displaceable part of the first composite gear is functionally aligned to the second composite gear at only a first alignment site and whenever a relative direction of rotation of the complementary gear is from the first alignment site towards a second alignment site, the method including the following steps:

while the complementary gear is engaged to a body of the first composite gear, displacing and aligning the displaceable part of an engaging surface of the second composite gear to an engaging surface of the first composite gear; and after the complementary gear engages the displaceable part of the second composite gear, the displaceable part is displaced back to its original position together with the complementary gear, before the complementary gear can engage a body of the second composite gear.

31. A method according to claim 28 used as a method for gear-ratio change in a variable transmission.

32. A method for achieving forward, backward and zero motion by utilizing subtraction of rotational movement as achieved by a differential assembly, possessing three input-output components, the input-output component comprising two half axles and a differential carrier, the method comprising feeding rotational motion from a power source through two power-trains to two of the input-output components of the differential assembly, with the inclusion of the method as described in claim 30, in at least one power train, while receiving output through the third input-output component of the differential assembly.

33. The method described in claim 32 used as a method of modulating rotational movement and torque in a variable transmission.

34. The method described in claim 32 used as a method of modulating rotational movement and torque in any vehicle.

35. The method described in claim 32 used as a method to modulate and distribute torque to individual wheels of any vehicle.

36. A method according to claim 28 used as a method of modulating rotational movement and torque in any vehicle.

37. A method according to claim 28 used as a method to modulate and distribute torque to individual wheels of any vehicle.

38. A device comprising a plurality of composite gears, and at least one complementary gear, the plurality of composite gears being connected to be adjacent to and coaxial with one another on a common central axis, each composite gear having a body and one of said plurality of composite gears having a displaceable part that can be displaced relative to said bodies of said plurality of composite gears in a direction parallel to an imaginary line of best alignment that allows the displaceable part to align with the body of an adjacent one of the plurality of composite gears, one of the plurality of composite gears and the at least one complementary gear being engaged with one another and transferring rotational motion, the displaceable part comprising an engaging surface for engaging with the at least one complementary gear, the plurality of composite gears being mounted so as to be functionally alignable, at the imaginary line of best alignment, to the body of an adjacent one of the plurality of composite gears, wherein the at least one complementary gear when engaged to the displaceable part is connected and configured to rotate across onto the bodies of the plurality of composite gears, wherein the displaceable part is shared between all of the plurality of composite gears and when a gear-shift is executed, the at least one complementary gear is displaced to a next composite gear together with the displaceable part, while being engaged with the displaceable part.

* * * * *